Nov. 18, 1958 — B. D. McINTYRE — 2,860,870
STABILIZER AND SPRING DEVICE
Filed Jan. 28, 1954 — 2 Sheets-Sheet 1
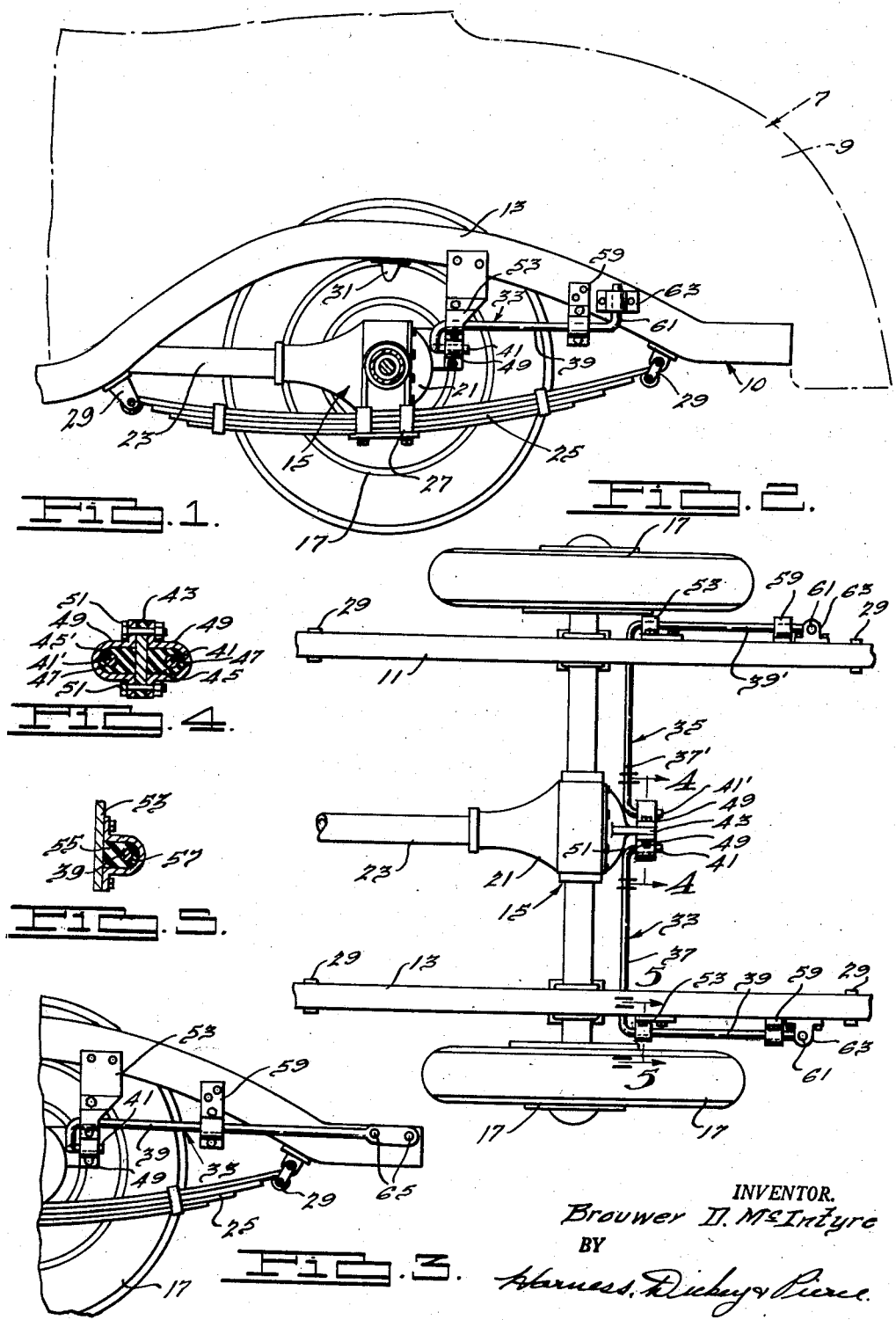
INVENTOR.
Brouwer D. McIntyre
BY
Harness, Dickey & Pierce
ATTORNEYS.

Nov. 18, 1958      B. D. McINTYRE      2,860,870
STABILIZER AND SPRING DEVICE
Filed Jan. 28, 1954      2 Sheets-Sheet 2
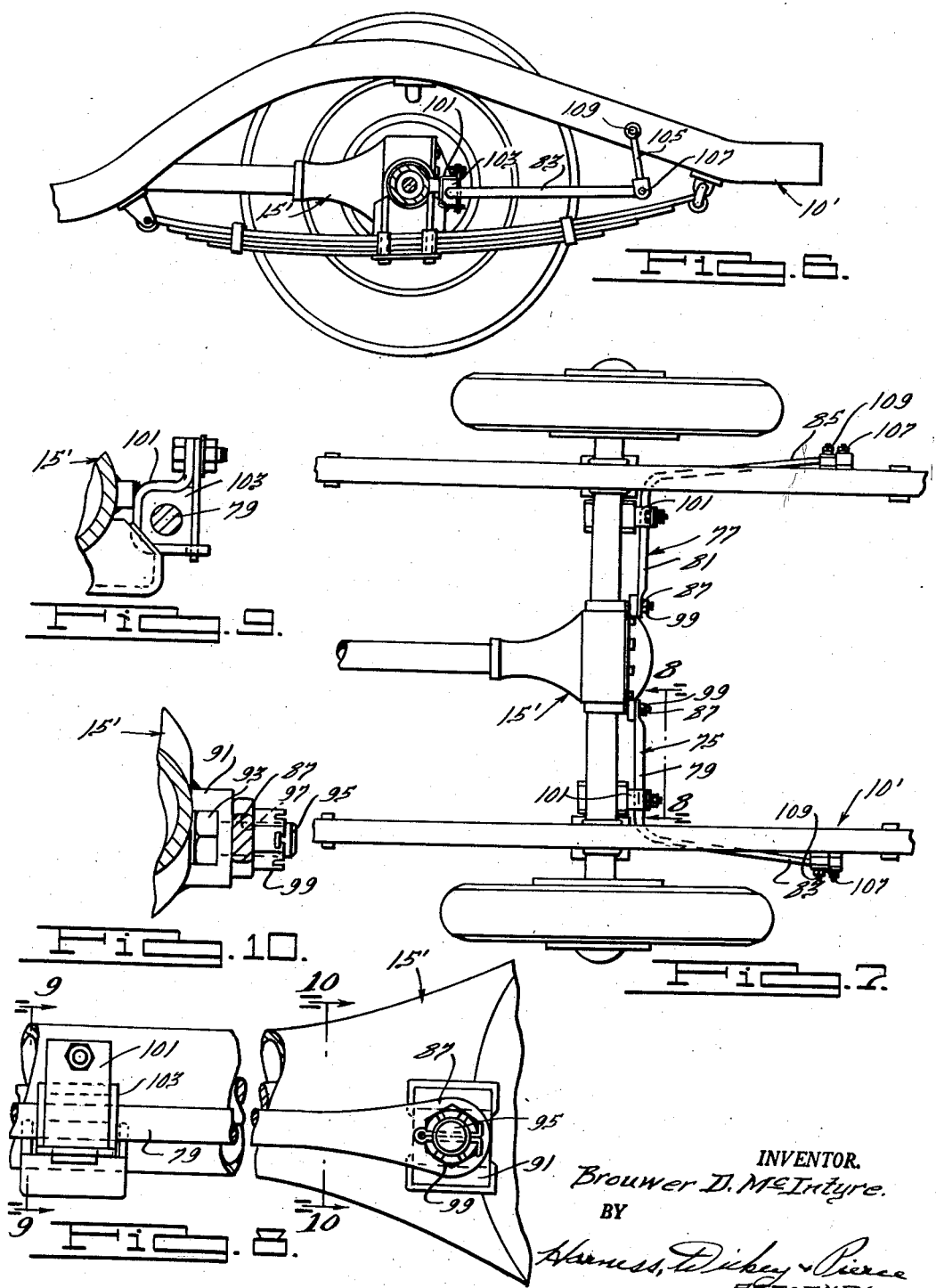
INVENTOR.
Brouwer D. McIntyre.
BY
ATTORNEYS.

United States Patent Office 2,860,870
Patented Nov. 18, 1958

2,860,870

STABILIZER AND SPRING DEVICE

Brouwer D. McIntyre, Monroe, Mich., assignor, by mesne assignments, to Monroe Auto Equipment Company, a corporation of Michigan Application January 28, 1954, Serial No. 406,621

8 Claims. (Cl. 267—11)

This invention relates generally to vehicle suspension systems and more particularly to a combination stabilizer and helper spring device for use with vehicle suspension systems, and is a continuation-in-part of applicant's co-pending application, Serial No. 226,618, filed May 16, 1951, now abandoned, and entitled Stabilizer and Spring Device.

In vehicle suspension systems, and more particularly rear vehicle suspension systems, several problems have not yet been solved in an attempt to obtain maximum riding comfort for vehicle passengers. For example, in automobile rear suspension systems a problem has always existed in connection with the vehicle frame, or a bumper pad thereon, striking or engaging the rear axle when the rear wheels strike a bad road bump. This is particularly true if the back seat of a vehicle is weighted by passengers, or the like. While various means such as shock absorbers and leaf springs have been employed in an attempt to eliminate this so-called "bottoming" of the vehicle sprung assembly on the unsprung assembly, the problem still exists. In the development of the automotive suspension systems, engineers have attempted to make as soft and comfortable a ride as possible, and in so doing, have used relatively flexible springs, so that a soft and comfortable ride could be obtained on normal road surfaces. However, with soft springs, as distinguished from stiff springs, the vehicle frame can bottom more easily on the rear axle, and if the springs or shock absorbers are made stiff enough to prevent bottoming, then the soft, comfortable ride on normal road surfaces is impaired.

In automotive constructions there is always a tendency for the vehicle body and frame, or sprung assembly, to move laterally relative to the axle and wheels, or unsprung assembly. As a result, many automotive manufacturers incorporate track bars or lateral struts to eliminate or reduce this lateral motion. In addition to this, when a vehicle turns a corner, or the like, there is a tendency for the sprung assembly or vehicle body to tilt relative to the vehicle unsprung assembly. To overcome this, automotive manufacturers have employed sway bars, which generally are torsion rods connected between the sprung and unsprung vehicle assemblies. In most automobiles these sway bars have been used only at the front of the vehicle and not adjacent the rear axle, so that body sway has not been removed as much as possible.

Still further, in most automotive vehicles using four-wheel brakes, when the brakes are applied, the axle, differential, and axle and differential housing tend to rotate forwardly, thereby acting through the springs, connected with the axle and the vehicle body, to raise the back end of the latter. At the same time, with conventional braking systems now employed, the front end of the vehicle body moves or "dives" downwardly when brakes are applied, so that the front of the body is lower than its back end. Such a condition is, of course, undesirable.

It is an object of this invention to provide a device which can be connected between the sprung and unsprung assemblies of a vehicle, which will eliminate, or at least materially reduce all of the aforementioned problems or difficulties in suspension systems.

It is a further object of this invention to provide a device of the aforementioned type, which is simple in construction, efficient in operation, and inexpensive to manufacture and maintain.

It is a still further object of this invention to provide a device of the aforementioned type, which will act as a helper spring for conventional vehicle springs, and which will not adversely affect the riding comfort of the vehicle obtained with a conventional suspension system.

It is a still further object of this invention to provide a device of the aforementioned type, which will resist lateral movement between the vehicle sprung and unsprung assemblies.

It is a still further object of this invention to provide a device of the aforementioned type, which will aid in reducing rotation of the rear axle relative to the vehicle body or sprung assembly, when the vehicle brakes are applied.

It is a still further object of this invention to provide a device of the aforementioned type which will act to reduce sway or tilting of the vehicle body or sprung assembly relative to the vehicle wheels or unsprung assembly, when the vehicle is turned.

It is a still further object of this invention to provide a device of the aforementioned type, which can be used either with a suspension system employing leaf springs or one employing coil or other types of springs.

It is a still further object of this invention to provide a device which will generally improve the riding and driving characteristics of vehicles, in a simple and inexpensive manner.

These and other objects of this invention will become apparent from the following detailed description, taken in conjunction with the accompanying drawings, in which:

Figure 1 is a side elevational view of a vehicle rear suspension system and an adjacent portion of an automotive vehicle;

Fig. 2 is a top plan view of the structure illustrated in Fig. 1;

Fig. 3 is a side elevational view, similar to Fig. 1, showing a further embodiment of the invention;

Fig. 4 is an enlarged sectional view of the structure illustrated in Fig. 2, taken along the line 4—4 thereof;

Fig. 5 is an enlarged sectional view of the structure illustrated in Fig. 2, taken along the line 5—5 thereof;

Fig. 6 is a side elevational view similar to Fig. 1, illustrating a further embodiment of the invention;

Fig. 7 is a top plan view of the structure illustrated in Fig. 1;

Fig. 8 is an enlarged elevational view of the structure illustrated in Fig. 7, taken along the line 8—8 thereof;

Fig. 9 is a sectional view of the structure illustrated in Fig. 8, taken along the line 9—9 thereof; and Fig. 10 is a sectional view of the structure illustrated in Fig. 8, taken along the line 10—10 thereof.

Referring now to the drawings and more particularly to Figures 1 through 5, it will be seen that a vehicle 7 is illustrated, which includes in a generally conventional manner a body 9 connected with a chassis frame 10 having longitudinally extending frame members 11 and 13, which extend from adjacent the front to adjacent the rear of the vehicle. A rear axle housing 15 is provided, which encloses in a conventional manner an axle connected with vehicle rubber-tired ground-engaging wheels 17. The axle housing 15 includes a central differential housing portion 21, in which differential gearing is supported in driving engagement with the wheel axles. A drive shaft 23 extends into the forward end of the differential housing portion 21 and is connected, in any suitable manner, with the differential gearing.

In the embodiments of the invention illustrated in the drawing, a leaf spring 25 is connected with the axle housing 15 adjacent each ground-engaging wheel, through suitable bracket and hanger means 27. The opposite ends of each spring 25 are connected with the frame 10 through suitable spring shackles 29. A bumper pad 31 is connected with each of the longitudinally extending frame members 11 and 13, as in most conventional vehicles, for engaging the axle housing 15 in the event the sprung assembly should bottom on the vehicle unsprung assembly. Thus, it will be seen that the structure heretofore described includes the elements of a conventional vehicle and vehicle rear suspension system, in which the vehicle sprung assembly, which includes the frame and body, is resiliently supported on the vehicle unsprung assembly, which includes the wheels and rear axle housing.

From the aforementioned description it will be apparent that in order to provide a soft, cushioned and comfortable ride for vehicle passengers, the springs 25 should be relatively flexible and not be so stiff as to impart harshness to the vehicle ride on normal road surfaces. At the same time the automotive manufacturer is confronted with the dilemma that if the springs 25 are soft and relatively flexible, the vehicle sprung assembly may bottom on the vehicle unsprung assembly if the wheels hit a sharp road bump. Even though practically all vehicles are provided with shock absorbers, which are not shown in the drawing of this application, these shock absorbers should also be constructed so as not to impart stiffness or harshness to the riding characteristics of the vehicle. Thus, in many automotive rear suspension systems, while a soft and comfortable ride is provided, the sprung assembly will bottom on the unsprung assembly when the vehicle wheels hit a bump, and such bottoming tends not only to be injurious to the vehicle itself, but also imparts a very severe jolt to the passengers in the vehicle.

In addition to the aforementioned, it can be appreciated from studying the drawing, that the vehicle sprung assembly can move laterally relative to the vehicle unsprung assembly when the vehicle is in operation, thus adversely affecting the driving characteristics of the vehicle and also providing a swaying effect which impairs the riding characteristics of the vehicle.

Still further, when the vehicle brakes are applied, which brakes are not shown in detail in the drawings of this application but which are incorporated in the wheel structure, forward rotation of the axle housing 15 occurs, which tends to act through the springs 25 to lift the back end of the vehicle upwardly. This movement adds to and increases the "diving" or tilting of the vehicle, which normally occurs when the brakes are applied.

In addition to the aforementioned, it will be appreciated that when the vehicle turns or rounds a curve, the vehicle sprung assembly tends to tilt relative to the unsprung assembly, so that one side of the body is lower than the other side. This, of course, is an undesirable characteristic for a vehicle, both from the driving and riding characteristic standpoints.

Applicant's device is designed to eliminate, or at least reduce all of the aforementioned undesirable vehicle characteristics, and while applicant's device is illustrated as applied to a vehicle in which leaf type springs 25 are employed, it can be employed with a vehicle in which other types of springs are employed. Most vehicles, of course, use leaf type rear springs, so that the so called "Hotchkiss" type drive can be employed. However, the invention is not limited in use to this specific suspension and drive arrangement and is usable with various types of vehicle suspensions and with various types of drive mechanisms for the vehicle rear wheels.

In the particular embodiments illustrated in the drawings, and more particularly in the embodiment illustrated in Figs. 1 and 2, applicant's device includes a pair of one-piece rod members 33 and 35, each of which includes a lever arm portion 37 and 37', respectively, and a torsion member or bar portion 39 and 39', respectively. It will, of course, be appreciated and understood that the lever arms and torsion members need not be integrally formed, but could be rigidly interconnected. The lever arm portions 37 and 37' extend laterally of the vehicle frame and have their inner ends bent to provide longitudinally extending end arm portions 41 and 41'. Each of the end arm portions 41 and 41' is connected with the axle housing 15 in a manner such as to permit the lever arm portions 37 and 37' to rock in a vertical plane about a horizontal axis.

In the particular embodiment illustrated, a platelike bracket member 43 is rigidly connected with the axle housing at substantially the center thereof, by any suitable means. The bracket 43 supports a pair of resilient bushings or blocks 45 and 45'. These bushings or blocks are preferably made from rubber or some other suitable resilient material, and each is provided with a central aperture 47. The end arm 41 of the rod member 33 extends through the central aperture of the rubber bushing 45 and the end arm 41' of the rod 35 extends through the central aperture of the rubber bushing 45'. The rubber bushings are clamped or otherwise connected with the bracket member 43 by members 49, and bolts and nuts 51. It will thus be seen that the end arms 41 and 41' of the rod members 33 and 35, respectively, are rotatably connected with the axle housing 15 in an adjacent side-by-side relationship, and that the lever arm portions 37 and 37' thereof extend in a generally end-to-end relationship laterally of the vehicle frame. Thus, the lever arms 37 and 37' can each rock in a vertical plane about the horizontal axis of the end arm portions 41 and 41', respectively, which are rotatably supported by the bushings and brackets on the axle housing 15. The importance of providing a resilient or yieldable connection between the inner ends of the lever arms and the axle housing will be brought out more fully hereinafter.

The torsion arm or member portions 39 and 39' extend angularly from the lever arm portions 37 and 37', respectively, and extend generally longitudinally of and parallel to the longitudinal vehicle frame members 11 and 13. The torsion member portions 39 and 39' may extend from their respective lever arm portions either forwardly or rearwardly of the vehicle frame, but in the illustrated embodiment the torsion arms extend rearwardly toward the back of the vehicle. The portion of each torsion bar 39 and 39', adjacent the outer end of its respective lever arm 37 or 37', is rotatably supported on the vehicle frame by means of a bracket 53 which is rigidly connected to the frame by any suitable means and extends downwardly therefrom. Resilient bushings 55, made of rubber or the like, are immovably clamped in the bracket 53 by any suitable means and each of the rubber bushings has a central aperture 57 through which the respective torsion bar portions extend and are supported for rotation. A similar bracket 59 is connected with each of the frame members 11 and 13 rearwardly of the bracket member 53 and these bracket members rotatably support a rearward portion of each of the torsion bars, in substantially the same manner as previously described.

In the embodiment illustrated in Figs. 1 and 2, the rear end of each torsion bar portion 39 and 39' is bent to provide an upwardly extending end arm 61, which end arm extends through and is connected with the vehicle frame by means of a suitable bracket 63. The end arm 61 of each of the torsion bar portions is, therefore, connected with the frame so that the rear end of each torsion bar can not rotate about a horizontal axis, and so that if the lever arms 37 and 37' rock, the bars 39 and 39' will act in torsion to resist such rocking movement.

Therefore, when the vehicle is being operated and the wheels 17 and 19 engage a bump or undulation in the road, the vehicle springs 25 will yield to cushion the bump to prevent or reduce the transmission of the jar or movement to the vehicle sprung assembly. At the same time, when relative vertical movement occurs between the vehicle sprung and unsprung assemblies, each of the lever arms 33 and 35 will rock in a vertical plane about the horizontal axis of its end arm 41 or 41', which is rotatably connected with the axle housing 15. This rocking movement of the lever arms 37 and 37' will cause rotation of the torsion bars 39 and 39', respectively, but as the ends of the torsion bars are anchored to the vehicle frame they cannot rotate so that the torsion bars will torsionally resist vertical movement between the vehicle sprung and unsprung assemblies. If the relative movement between the sprung and unsprung assemblies is relatively small, the amount of torsional resistance provided by the torsion bars will be small or negligible, so that the device of this invention will not adversely affect the soft cushioning ride characteristics of the vehicle, as provided by the vehicle springs 25. However, if the vehicle wheels engage or strike a large bump or undulation in the road, so that considerable relative movement between the vehicle sprung and unsprung assemblies occurs and so that the vehicle sprung assembly will tend to bottom or engage the unsprung assembly, the torsional resistance provided by the torsion bars 39 and 39' will be such as to effectively resist such movement. It will, of course, be understood that the torsional resistance increases as the relative vertical movement between the sprung and unsprung assemblies increases. The device of this invention will, therefore, act as a helper spring and will be effective to prevent engagement of the vehicle sprung and unsprung assemblies, and will reduce and resist vertical movements of the larger amplitudes between the vehicle sprung and unsprung assemblies, without adversely affecting the desired normal vehicle ride provided by the vehicle springs 25.

When the lever arms 37 and 37' rock in a vertical plane as a result of the relative vertical movement between the vehicle sprung and unsprung assemblies, an arcing movement takes place. That is, as the rod members 33 and 35 are connected to both the axle housing 15 and the vehicle frame 10, this rocking action will tend to move either the lateral inner end of each rod member or the lateral outer end of each rod member through an arc, so that the opposite ends of each lever arm 37 or 37' will tend to move either toward or away from each other during their arcuate path of travel. If the lever arms were rigidly connected with the axle housing and the torsion bars rigidly connected with the vehicle frame, bending of the lever arm would occur during the rocking action and relative vertical movement between the vehicle sprung and unsprung assemblies. While it may be possible for the rod members to withstand such bending movement, applicant prefers to employ the rubber bushings or yieldable connection of the lever arms 37 and 37' with the axle housing 15 and the torsion bars 39 and 39' with the vehicle frame members 13 and 11. Such a connection permits slight yieldable or lateral movement between the lever arms and axle housing and the torsion bars and frame members, to thereby eliminate or at least materially reduce any bending in the rod members 33 and 35. While rubber bushings have been illustrated as the means for providing this yieldable connection, it will be apparent that other sorts of yieldable connections could be employed.

Depending upon the flexibility of springs 25, the weight of the vehicle, and various other factors, it may be desirable in some circumstances to preload the device of this invention. That is, in certain circumstances it may be desirable to alter the normal relationship between the sprung assembly and the unsprung assembly when connecting the rod members 33 and 35 thereto, to thereby impart a certain amount of pre-torsional loading in the torsion arms 39 and 39'. This preloading should not be such as to raise the car height, but under certain circumstances it may be desirable, in order to provide for a faster build-up of the torsional resistance of the device during relative vertical movement between the vehicle sprung and unsprung assemblies.

While the inner ends of the lever arms 37 and 37' are illustrated as being connected with the center of the axle housing 15 in a side-by-side adjacent relationship, it will be appreciated that the lever arms 37 and 37' could be connected with the axle housing at various points along the length thereof. If, however, the arms are connected with the axle housing laterally outwardly of that shown, the arcing movement which will be imparted to the inner ends of the arms 37 and 37' during relative vertical movement between the vehicle sprung and unsprung assemblies will be greater, so that there will be a tendency for more lateral movement of the inner ends of the lever arms or more bending in the arms. Of course, by moving the lateral inner connections of the lever arms to a point outwardly of that shown, the torsion bars 39 and 39' may be torsionally loaded more rapidly and to a greater extent than in the embodiment illustrated, and while applicant's invention is not limited to any particular point of connection to the axle housing, the manner illustrated is preferred because the lever arm length is such as to keep the arcing movement to a limited, practical extent.

Due to the fact that the rod members 33 and 35 are connected to both the axle housing and the vehicle frame, it will be seen that the device of this invention eliminates, or at least reduces to a minimum the possibility of relative lateral movement between the axle housing 15 and the vehicle frame or body. Thus, the device of this invention, in addition to acting as a helper spring as described above, eliminates the necessity of track bars or lateral struts, such as are commonly employed on vehicles today to prevent this lateral motion between the vehicle sprung and unsprung assemblies.

Still further, as the inner ends of the lever arms 37 and 37' are connected to the axle housing 15 on the back side thereof, the device of this invention will resist forward rotation of the axle housing when the vehicle brakes are applied. Such forward rotation causes the back end of the vehicle body to raise and aggravates the tendency of vehicles to "dive" when the brakes are applied. As the device of this invention is connected between the vehicle sprung and unsprung assemblies, it torsionally resists such movement and serves a further purpose of tending to hold down the back end of the vehicle sprung assembly when the vehicle brakes are applied.

In addition to all of the aforementioned advantages of the device, it will be appreciated that the device will act as a sway bar so that if the relative vertical position between one side of the vehicle and the opposite side thereof differs, or in other words, if the vehicle sprung assembly tends to tilt on the unsprung assembly, the rod members 33 or 35 will torsionally resist such tilting movement and will tend to maintain the sprung assembly in its normal level position. Therefore, the device of this invention will act as a sway bar to resist tilting of the body, in addition to acting as a helper spring, a track bar and a means for preventing rotation of the vehicle axle.

In the embodiment of the invention illustrated in Fig. 3, the device is identical with that previously described, except that the extreme rear ends of the torsion arms 39 and 39' are connected to the vehicle frame or to the conventional bumper bar which is connected with the frame, by means of bolts or cap screws 65. Otherwise, the structure illustrated in Fig. 3 is substantially the same as that previously described, and operates and functions in the same manner.

A further embodiment of the device of this invention is illustrated in Figs. 6 through 10, mounted on a vehicle of the type previously described. In this embodiment laterally spaced one piece rod members 75 and 77 are provided, each of which includes a torsion bar portion 79 and 81, respectively, and an angularly extending lever arm portion 83 and 85, respectively. Each of the torsion bar portions 79 and 81 extends laterally of the vehicle frame substantially parallel to the axle and axle housing 15'. The torsion bars have their inner ends flattened to provide substantially flat inner end portions 87, which are rigidly connected with the axle housing 15' by means of a generally U-shaped bracket 91 which is rigidly connected with the axle housing and supports a bolt 93, the threaded end 95 of which projects rearwardly from the axle housing. The end portions 87 of the torsion bars are apertured at 97 to receive the threaded ends 95 of the bolts and a nut 99 is threaded on each bolt into tight engagement with the torsion bar end portion to anchor the same and prevent rotation thereof about a horizontal axis or the longitudinal axis of the torsion bar. Laterally outwardly of the brackets 91, brackets 101 are rigidly connected with the axle housing and support a resilient bushing 103 through which the torsion bars 79 and 81 extend. The outer ends of the torsion bar are thus rotatably and resiliently supported on the axle housing to permit the device to properly operate when the lever arms are actuated, as will hereinafter appear. The lever arms 83 and 85 extend angularly from the outer ends of the torsion bars 79 and 81 respectively and have their free ends pivotally connected with the opposite sides of the vehicle frame 10'. In this connection a link 105 is pivotally connected at its lower end at 107 to the free end of each lever arm, while the upper end of each link is pivotally connected at 109 to a longitudinal frame member of the vehicle frame 10'. The pivotal connections of the lever arms with the frame permit the lever arms to rock in a generally vertical plane so that relative movement between the vehicle frame and axle housing will cause torsional loading of the torsion bars 79 and 81 to provide the same beneficial effects as described in connection with the previous embodiments. It will also be understood that the torsion bars and lever arms could be separate elements, rigidly interconnected, but an integral construction is preferred.

It will thus be appreciated that in this embodiment the torsion bars extend laterally of the vehicle while the lever arms extend generally longitudinally thereof, whereas in the embodiments illustrated in Figures 1 through 5, the bar members are reversely arranged. However, the same beneficial results are obtained with this construction as with the previous construction and on many vehicles this type of installation is more satisfactory becaues of specific installation and clearance problems.

It will thus be apparent that the device of this invention is a multi-function device, which prevents or reduces many of the undesirable vehicle characteristics which have been described in detail above, without adversely affecting any of the desirable characteristics of the vehicle suspension system.

What is claimed is:

1. In a vehicle having a pair of laterally spaced ground engaging wheels, axle housing means extending between and interconnecting said wheels, vehicle frame means, spring means connected between said axle housing means and said frame means so that said frame means is sprung on said housing means and wheels, a pair of bar members disposed on opposite sides of said frame means, said bar members including laterally extending portions disposed in substantially coaxial spaced relationship under a predetermined load, each of said bar members including a portion extending angularly and substantially horizontally from the outer end of its laterally extending portion, elements connecting the inner ends of said lateral bar member portions to the rear of said axle housing means and in substantially the same horizontal plane as said axle housing means, elements connecting the free ends of said angularly extending bar member portions to opposite sides of said frame means, the elements connecting the bar member portions to one of said means effecting pivotal connections with said means to permit those portions of said bar members to rock generally vertically, the elements connecting the other bar member portions to the other of said means effecting an anchoring of the bar portions to the other of said means so that said anchored portions will be placed in torsion upon rocking movement of said pivotally connected bar portions, and means rotatably connecting the anchored bar member portions intermediate their ends to the means to which they are connected.

2. In a vehicle having a pair of laterally spaced ground engaging wheels, an axle interconnecting said wheels, a housing for said axle, a frame for said vehicle, spring means connected between said axle housing and said frame so that said frame is sprung on said axle housing and wheels, a pair of lever arms extending laterally in an end-to-end spaced relationship substantially parallel to and in substantial alignment with said axle housing, bushing means directly connecting the inner ends of said lever arms to said axle housing so as to permit said lever arms to rock in a vertical plane about the connection to said axle housing, torsion members extending angularly from the outer ends of said lever arms, and means anchoring the free ends of said torsion members to the opposite sides of said frame so that relative vertical movement between said axle housing and said frame will be resisted by said spring means, as well as by said torsional members.

3. In a vehicle having a pair of laterally spaced ground engaging wheels, an axle interconnecting said wheels, a housing for said axle, a vehicle frame, spring means connected between said axle housing and said frame so that said frame is sprung on said axle housing and wheels, a pair of lever arms extending laterally in an end-to-end spaced relationship, means connecting the inner ends of said lever arms to said axle housing rearwardly of said axle so as to permit said lever arms to rock in a vertical plane about the connection to said axle housing, torsion members extending angularly from the outer ends of said lever arms, means rotatably connecting said torsion members intermediate the ends thereof to said vehicle frame, and means anchoring the free ends of said torsion members to the opposite sides of said frame so that relative vertical movement between said axle housing and said frame will be resisted by said spring means, as well as by said torsion members.

4. In a vehicle having a pair of laterally spaced ground engaging wheels, an axle extending between and interconnected with said wheels, a housing for said axle, a vehicle frame, spring means connected between said axle housing and said frame so that said frame is sprung on said axle housing and wheels, a pair of lever arms extending laterally in an end-to-end spaced relationship, means including resilient bushings connecting the inner ends of said lever arms to said axle housing in an adjacent side-by-side relationship rearwardly of said axle so as to permit said lever arms to rock in a vertical plane about the axes of said resilient bushings, torsion members extending angularly from the outer ends of said lever arms, means including resilient bushings rotatably connecting said torsion members intermediate the ends thereof to said vehicle frame, and means anchoring the free ends of said torsion members to the opposite sides of said frame so that relative vertical and lateral movement between said axle housing and said frame will be resisted by said torsion members.

5. A device for use on a vehicle having sprung and unsprung assemblies, to aid in controlling relative vertical and lateral movement between said assemblies, said device including a pair of one-piece rod members disposed in generally end-to-end spaced relationship, each of said rod members including a laterally extending lever arm portion, the inner ends of each of said lever arm portions being bent to provide an angularly extending portion, a bracket assembly including adjacently spaced resilient bushings for connecting said angularly extending portions to the vehicle unsprung assembly, so that each of said lever arm portions can rock in a vertical plane about the axis of its angularly extending portion, torsion bar portions extending angularly from the lateral outer ends of said lever arm portions, means including a resilient bushing for rotatably connecting an intermediate part of each of said torsion bar portions to the vehicle sprung assembly, and means for anchoring the free end of each of said torsion bar portions to the vehicle sprung assembly.

6. In a vehicle having a pair of laterally spaced ground engaging wheels, an axle housing extending between and interconnected with said wheels, a vehicle frame, spring means connected between said axle housing and said frame so that said frame is sprung on said axle housing and wheels, a pair of torsion bars extending laterally of said vehicle in an end-to-end spaced relationship, means anchoring the adjacent inner ends of said bars to said axle housing rearwardly of said axle, means including a resilient bushing element rotatably connecting said bars to said axle housing outwardly of the inner ends thereof, a lever arm extending angularly from the outer end of each of said torsion bars, and means pivotally connecting the free ends of said arms to the opposite sides of said frame so as to permit said lever arms to rock generally vertically.

7. In a vehicle having a pair of laterally spaced ground engaging wheels, an axle housing extending between and interconnected with said wheels, a vehicle frame, spring means connected between said axle housing and said frame so that said frame is sprung on said axle housing and said wheels, a pair of torsion bars extending laterally of said vehicle in an end-to-end spaced relationship, means anchoring the adjacent ends of said bars to said axle housing rearwardly of said axle to prevent rotation of said free ends about a generally horizontal axis, means rotatably connecting said bars to said axle housing outwardly of the inner ends thereof, a lever arm extending angularly from the outer end of each of said torsion bars, and a link element pivotally connected with the free end of each of said lever arms and pivotally connected to the adjacent portion of said vehicle frame so as to permit said lever arms to rock generally vertically.

8. In a vehicle having a pair of laterally spaced ground engaging wheels, an axle housing extending between and interconnected with said wheels, a vehicle frame, spring means connected between said axle housing and said frame so that said frame is sprung on said axle housing and wheels, a pair of torsion bars extending laterally of said vehicle frame in an end-to-end spaced relationship generally parallel to said axle, the inner ends of said torsion bars being provided with substantially flat portions having an aperture therethrough, fastener means connecting said flat bar portions rigidly to said axle housing so that rotation of said bar portions about their longitudinal axes will be prevented, bracket means rigidly connected with said axle housing laterally outwardly of each of said fastener means, a resilient bushing supported by each of said bracket means and rotatably connecting each of said bars with said axle housing, a lever arm extending angularly from the outer end of each of said torsion bars adjacent the opposite sides of the vehicle frame, and means pivotally connecting the free ends of said lever arms to the opposite sides of said vehicle frame so as to permit said lever arms to rock generally vertically.

References Cited in the file of this patent

UNITED STATES PATENTS

| | | |
|---|---|---|
| 169,032 | Paris | Oct. 19, 1875 |
| 2,130,431 | Rabe | Sept. 20, 1938 |
| 2,542,363 | Sarnac | Feb. 20, 1951 |
| 2,548,507 | Wharam et al. | Apr. 10, 1951 |